Figure 1:
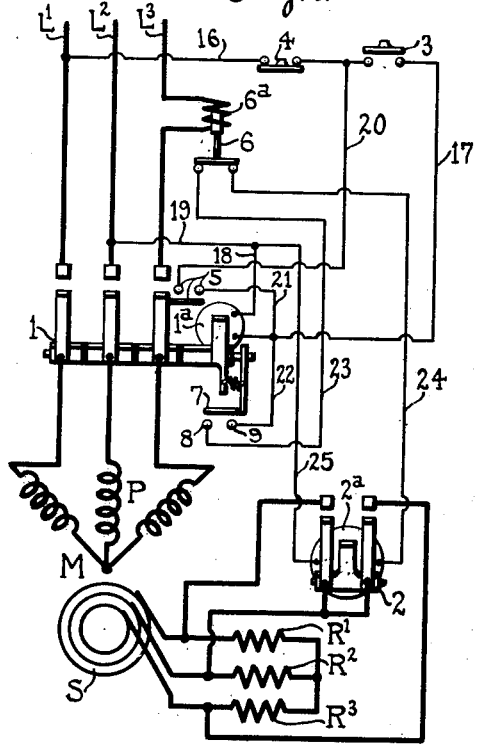

April 20, 1926.

E. W. SEEGER

MOTOR CONTROLLER

Filed March 16, 1925

1,581,143

INVENTOR.
Edwin W. Seeger.
BY Frank H. Hubbard
ATTORNEY

Patented Apr. 20, 1926.

1,581,143

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed March 16, 1925. Serial No. 15,735.

*To all whom it may concern:*

Be it known that I, EDWIN W. SEEGER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers, and is particularly applicable to automatic starting controllers of the current limit type.

Starting controllers of the aforesaid type commonly include series relays for controlling accelerating operations, such relays being adapted to respond upon establishment of power connections for the motor and being adapted to drop out to effect closure of the accelerating switches as the speed of the motor increases. Since the series relays are normally closed it is necessary to provide means for preventing immediate closure of the accelerating switches upon establishment of power connections for the motor.

The present invention has among its objects to provide a controller of the aforesaid character having improved means associated therewith for insuring against immediate response of the accelerating switches upon establishment of power connections for the motor.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing:

Figure 1 diagrammatically illustrates a controller embodying the invention, and

Figure 2:
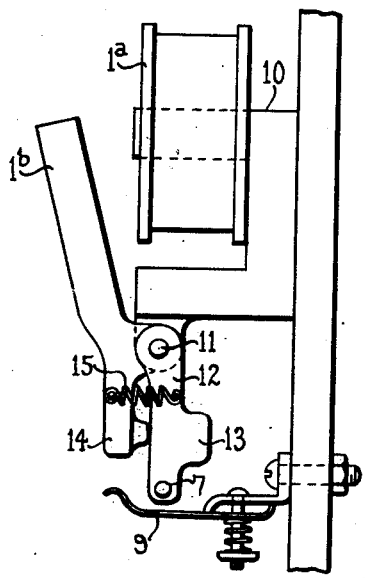

Fig. 2 is a side elevational view of certain of the control parts illustrated in Fig. 1.

Referring to Fig. 1, the controller is shown in connection with a three phase alternating current motor M having a primary P and a secondary S, the secondary being provided with starting resistances $R^1$, $R^2$ and $R^3$. A three pole electromagnetic main switch 1 is provided for connecting the primary P to a three phase supply circuit indicated by lines $L^1$, $L^2$ and $L^3$, and a two pole electromagnetic accelerating switch 2 is provided for excluding resistances $R^1$, $R^2$ and $R^3$ in the secondary circuit of said motor.

The control means for main switch 1 includes a normally open starting push button 3 and a normally closed stop push button 4, and, as hereinafter set forth said main switch in responding is adapted to maintain itself in closed position through the medium of normally open auxiliary contacts 5. The control means for accelerating switch 2 includes a normally closed relay 6 having an operating winding $6^a$ connected in series in line $L^3$, and a contact 7 associated with switch 1 which is adapted to bridge stationary contacts 8 and 9.

As shown in Fig. 2 the operating winding $1^a$ of main switch 1 is provided with a U-shaped core member 10 and the operating armature $1^b$ of said main switch is mounted upon a pin 11 carried by said core member. Also, as shown in this figure, bridging contact 7 is fixed to the lower end of an arm 12 rotatably mounted upon pin 11 and said arm is biased by a weighted portion 13 to move to a position wherein contact 7 bridges its cooperating stationary contacts 8 and 9. However, when main switch 1 is in open position, contact 7 is held in open position by a tail piece 14 on armature $1^b$. If desired arm 12 may be connected to tail piece 14 by a spring 15.

The function and operation of the aforedescribed controller together with the circuit connections therefor will now be more fully described in connection with Fig. 1. Upon depression of starting push button 3 main switch 1 is energized by a circuit extending from line $L^1$ by conductor 16, through push buttons 4 and 3, by conductor 17 through the operating winding $1^a$, and by conductors 18 and 19 to line $L^2$. In responding, main switch 1 maintains itself in closed position by a circuit extending from line $L^1$, by conductor 16 through push button 4, by conductor 20 through auxiliary contacts 5, by conductor 21 to and through the operating winding $1^a$ and by conductors 18 and 19 to line $L^2$. Upon closure of main switch 1 relay 6 is energized and moves to open position and following closure of main switch 1 contact 7 moves into engagement with contacts 8 and 9. However, it should be noted that due to the inertia of arm 12 closure of contact 7 is delayed for an interval depending upon the inertia of said arm and the tension of spring 15. In practice, arm 12 and spring 15 are so designed as to delay closure of contact 7 for an interval which is sufficient to insure opening of relay 6. Relay 6 is adjusted to drop out upon a predetermined reduction in the current in the motor circuit and upon dropping out thereof, accelerating switch 2 is energized by a circuit extending from line L¹, by conductor 16 through push button 4, by conductor 20 to and through the auxiliary contacts 5 associated with switch 1, by conductors 21 and 22 through the auxiliary contacts 9, 7 and 8, by conductor 23 through series relay 6, by conductor 24 through the operating winding 2ª of said accelerating switch and by conductors 25 and 19 to line L². It is apparent that upon closure of switch 2 the resistances R¹, R² and R³ are excluded from the secondary circuit of the motor for running.

Opening of push button 4 interrupts the aforedescribed energizing circuits of main switch 1 and accelerating switch 2, and in order to restart the motor it is necessary to again depress push button 3.

In connection with the foregoing it should be noted that the controller is capable of use in connection with other types of motors, and it is also apparent that the number of accelerating steps can be increased if desired.

What I claim as new and desire to secure by Letters Patent is:

1. In a motor controller, in combination, a main switch for establishing power connections for the motor, an accelerating switch for the motor and control means for said accelerating switch including an electro-responsive relay responsive to current conditions in the motor circuit, a normally open contact element associated with said main switch for establishing an energizing circuit for said accelerating switch through the medium of said relay, said contact element tending to close upon closure of said main switch, and being of relatively large inertia to delay closure thereof.

2. In a motor controller, in combination, an electro-responsive main switch, an electro-responsive accelerating switch and control means for said accelerating switch including a relay responsive to current conditions in the motor circuit, a normally open contact associated with said main switch for establishing an energizing circuit for said accelerating switch through said relay, said contact tending to close upon closure of said main switch, and inertia means associated with said contact to delay closure thereof.

3. In a motor controller, in combination, an electro-responsive main switch, an electro-responsive accelerating switch and control means for said accelerating switch including a relay having an operating winding connected in series in the motor circuit and a normally open contact associated with said main switch for establishing an energizing circuit through said relay for said accelerating switch, said contact being held in open position when said main switch is in open position and tending to close upon closure of said main switch, and a pivoted inertia member associated with said contact to delay closure thereof.

In witness whereof, I have hereunto subscribed my name.

EDWIN W. SEEGER.